(12) United States Patent     (10) Patent No.:   US 12,585,180 B1

Madern     (45) Date of Patent:   Mar. 24, 2026

(54) X-RAY AIMING RING APPARATUS AND SETUPS

(71) Applicant: Ashley L. Madern, Phoenix, AZ (US)

(72) Inventor: Ashley L. Madern, Phoenix, AZ (US)

( * ) Notice: Subject to any disclaimer, the term of this patent is extended or adjusted under 35 U.S.C. 154(b) by 0 days.

(21) Appl. No.: 19/274,584

(22) Filed: Jul. 20, 2025

(51) Int. Cl.
G03B 42/04 (2021.01)

(52) U.S. Cl.
CPC ................................. G03B 42/042 (2013.01)

(58) Field of Classification Search
CPC ..... A61B 6/4435; A61B 6/512; A61B 6/4233; A61B 50/20; A61B 6/06; A61B 6/4411; A61B 2050/21; A61B 6/4283; A61B 6/589; A61B 6/51; A61B 6/08; A61B 6/425; A61B 6/145; A61B 6/14; A61B 6/4429; A61B 6/4423; A61B 6/587; A61B 6/44; A61B 6/035; A61B 6/4035; A61B 6/42; A61B 6/04; A61B 6/548; A61B 6/5258; G03B 42/042; G03B 42/025; G21K 1/04; A61C 19/04; G03C 3/003; G01N 23/046; G01N 2223/419; Y10S 378/901
USPC ....................................... 378/168
See application file for complete search history.

(56) References Cited

U.S. PATENT DOCUMENTS

| | | | |
|---|---|---|---|
| 3,745,344 A | 7/1973 | Updegrave | |
| 4,048,506 A | 9/1977 | Updegrave | |
| 4,166,220 A | 8/1979 | Stutts | |
| 5,090,047 A | 2/1992 | Angotti et al. | |
| 7,172,339 B2 | 2/2007 | Diederich | |
| 7,194,064 B2 | 3/2007 | Razzano et al. | |
| 7,195,395 B2 * | 3/2007 | Quarry ................... | A61B 6/512 |
| | | | 378/170 |
| 7,866,883 B2 * | 1/2011 | Machado ............. | A61B 6/4435 |
| | | | 378/170 |
| 9,095,289 B2 * | 8/2015 | Kirkpatrick .......... | A61B 6/4435 |
| 9,144,410 B1 * | 9/2015 | Chen ........................ | G21K 1/04 |
| 2005/0185767 A1 * | 8/2005 | Puente ................. | A61B 6/4435 |
| | | | 378/168 |
| 2014/0161234 A1 * | 6/2014 | Razzano ................. | A61B 6/51 |
| | | | 378/147 |
| 2016/0038105 A1 | 2/2016 | Hayman et al. | |

* cited by examiner

*Primary Examiner* — Irakli Kiknadze

(74) *Attorney, Agent, or Firm* — Parsons & Goltry, PLLC; Michael W. Goltry; Robert A. Parsons

(57) ABSTRACT

An X-ray aiming ring apparatus includes an aiming ring defining an opening, and a connector including a first extremity defining an inlet, a second extremity defining an outlet, and an X-ray beam channel through the connector from the inlet to the outlet. The connector extends outward to the first extremity from the second extremity connected to the aiming ring, the X-ray beam channel is open to the opening by the outlet, and the first extremity is configured to connect mechanically to an X-ray machine position-indicating tube having an open discharge end and arranged about an X-ray beam centerline, to open the X-ray beam channel to the open discharge end by the inlet and axially align the open discharge end, the inlet, the X-ray beam channel, and the outlet along the X-ray beam centerline.

18 Claims, 16 Drawing Sheets

X-RAY AIMING RING APPARATUS AND SETUPS

FIELD OF THE INVENTION

The present invention relates to dental X-ray imaging and, more particularly, to aiming rings used in dentistry to align an X-ray beam with an image receptor.

DESCRIPTION OF RELATED ART

Intraoral X-ray imaging is a type of dental radiography that uses an image receptor, such as an X-ray sensor or film, placed inside a subject's mouth to capture images of an intraoral target by exposing the film to an X-ray beam generated outside the mouth and passing through the intraoral target to detect cavities, assess tooth development, bone and gum health, and diagnose dental conditions. A positioning arm connects the image receptor to an aiming ring, part of a dental X-ray positioning system to align the X-ray beam with the image receptor. The positioning arm aligns the aiming ring with the image receptor. After securing the image receptor in the subject's mouth, the technician aligns the X-ray machine's position-indicating tube with the image receptor using the aiming ring to align the X-ray beam with the image receptor. Precise alignment of the image receptor with the X-ray beam through the aiming ring ensures proper imaging. Conventionally, aligning the position-indicating tube with the image receptor by the aiming ring is done manually, which is cumbersome and complex and often leads to imaging errors, requiring repeated alignment adjustments and repeated imaging to obtain suitable images, necessitating continued improvement in the art.

SUMMARY OF THE INVENTION

According to the invention, an X-ray aiming ring apparatus includes an aiming ring and a connector. The aiming ring defines an opening. The connector includes a first extremity and a second extremity. The first extremity defines an inlet. The second extremity defines an outlet. The connector defines an X-ray beam channel through the connector from the inlet to the outlet. The connector extends outward to the first extremity from the second extremity connected to the aiming ring. The X-ray beam channel is open to the opening by the outlet. The first extremity is configured to connect mechanically to an X-ray machine position-indicating tube having an open discharge end and arranged about an X-ray beam centerline, to open the X-ray beam channel to the open discharge end by the inlet and axially align the open discharge end, the inlet, the X-ray beam channel, and the outlet along the X-ray beam centerline. The aiming ring and the connector have interconnecting portions connecting the second extremity to the aiming ring. The interconnecting portions include male portions carried by the connector and female portions formed in the aiming ring, the male portions interconnecting the respective female portions. The second extremity is a rim defining the outlet and the male portions extend outward from the connector adjacent to rim. The female portions are open, enabling withdrawal of the male portions from the female portions to detach the second extremity from the aiming ring. The aiming ring has a first surface and a second surface, the opening is through the aiming ring from the first surface to the second surface, and the female portions are formed in the aiming ring between the first surface and the second surface. The outlet and the inlet are parallel to each other, the outlet is larger than the inlet that is larger than the open discharge end, and the channel tapers from the outlet to the inlet. The open discharge end, the inlet, and the outlet are each rectangular. The first extremity and the open discharge end are configured to be inserted one into the other to connect the coupling mechanically to the X-ray machine position-indicating tube.

According to the invention, an X-ray aiming ring setup includes an aiming ring, a connector, and an X-ray machine position-indicating tube. The X-ray machine position-indicating tube has an open discharge end and is arranged about an X-ray beam centerline. The aiming ring defines an opening. The connector includes a first extremity and a second extremity. The first extremity defines an inlet. The second extremity defines an outlet. The connector defines an X-ray beam channel extending through the connector from the inlet to the outlet. The connector extends outward to the first extremity from the second extremity connected to the aiming ring. The X-ray beam channel is open to the opening by the outlet. The first extremity is connected mechanically to the X-ray machine position-indicating tube, opening the X-ray beam channel to the open discharge end by the inlet and axially aligning the open discharge end, the inlet, the X-ray beam channel, and the outlet along the X-ray beam centerline. The aiming ring and the connector have interconnecting portions connecting the second extremity to the aiming ring. The interconnecting portions include male portions carried by the connector and female portions formed in the aiming ring. The second extremity is a rim defining the outlet and the male portions extend outward from the connector adjacent to the rim. The female portions are open, enabling withdrawal of the male portions from the female portions to detach the second extremity from the aiming ring. The aiming ring has a first surface and a second surface, the opening is through the aiming ring from the first surface to the second surface, and the female portions are formed in the aiming ring between the first surface and the second surface. The outlet is smaller than the opening of the aiming ring. The outlet and the inlet are parallel to each other, the outlet is larger than the inlet that is larger than the open discharge end, and the channel tapers from the outlet to the inlet. The open discharge end, the inlet, and the outlet are each rectangular. The first extremity is a rim defining the inlet and is fit over an outward-facing annular recess formed in the X-ray machine position-indicating tube, mechanically connecting the first extremity to the X-ray machine position-indicating tube and locating the open discharge end within the inlet.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Disclosed are an X-ray aiming ring apparatus and setups.

Figure 1:
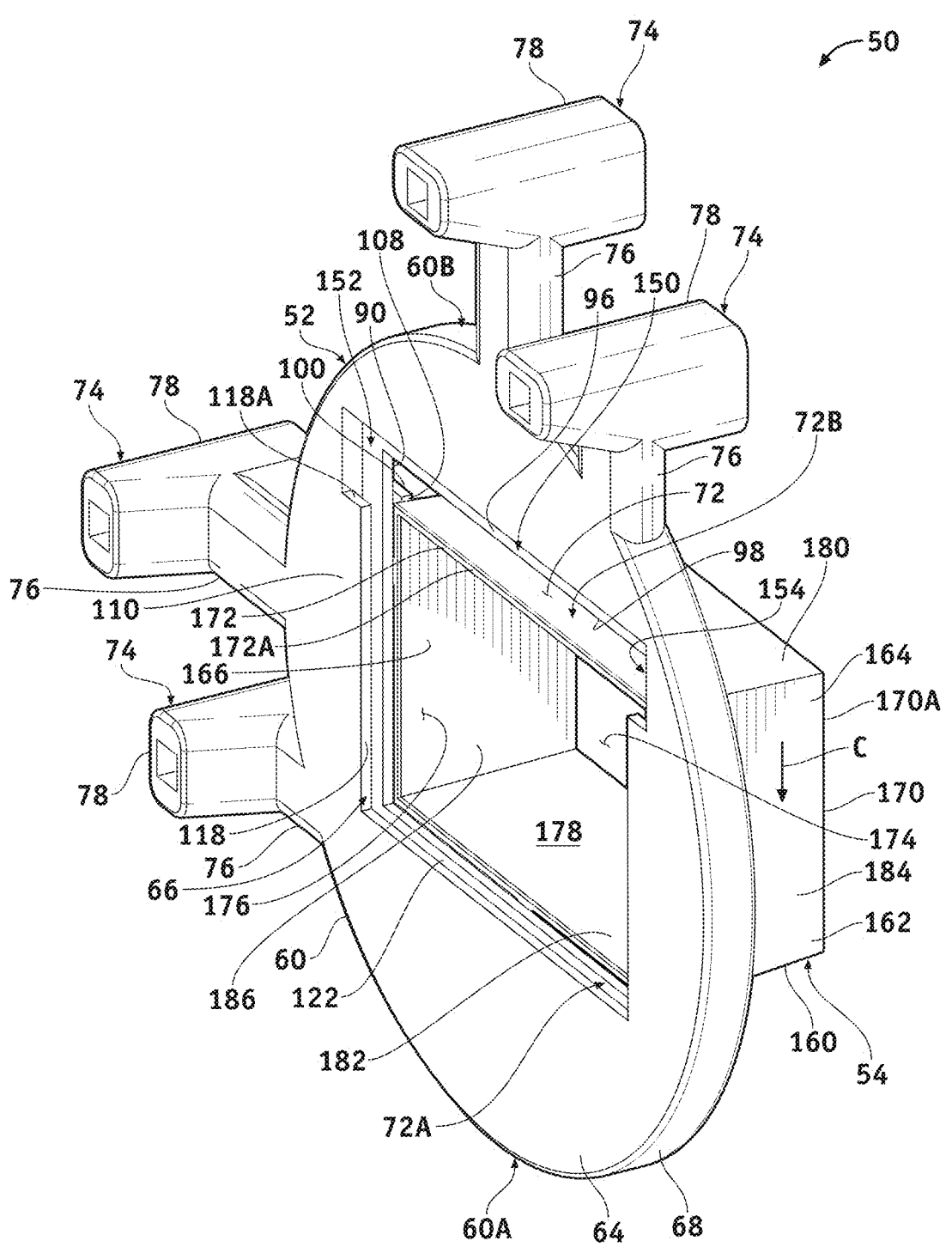
FIG. 1 is a front perspective view of an X-ray aiming ring apparatus constructed and arranged according to the invention, the X-ray aiming ring apparatus including an assembly of an aiming ring and a connector.
Figure 2:
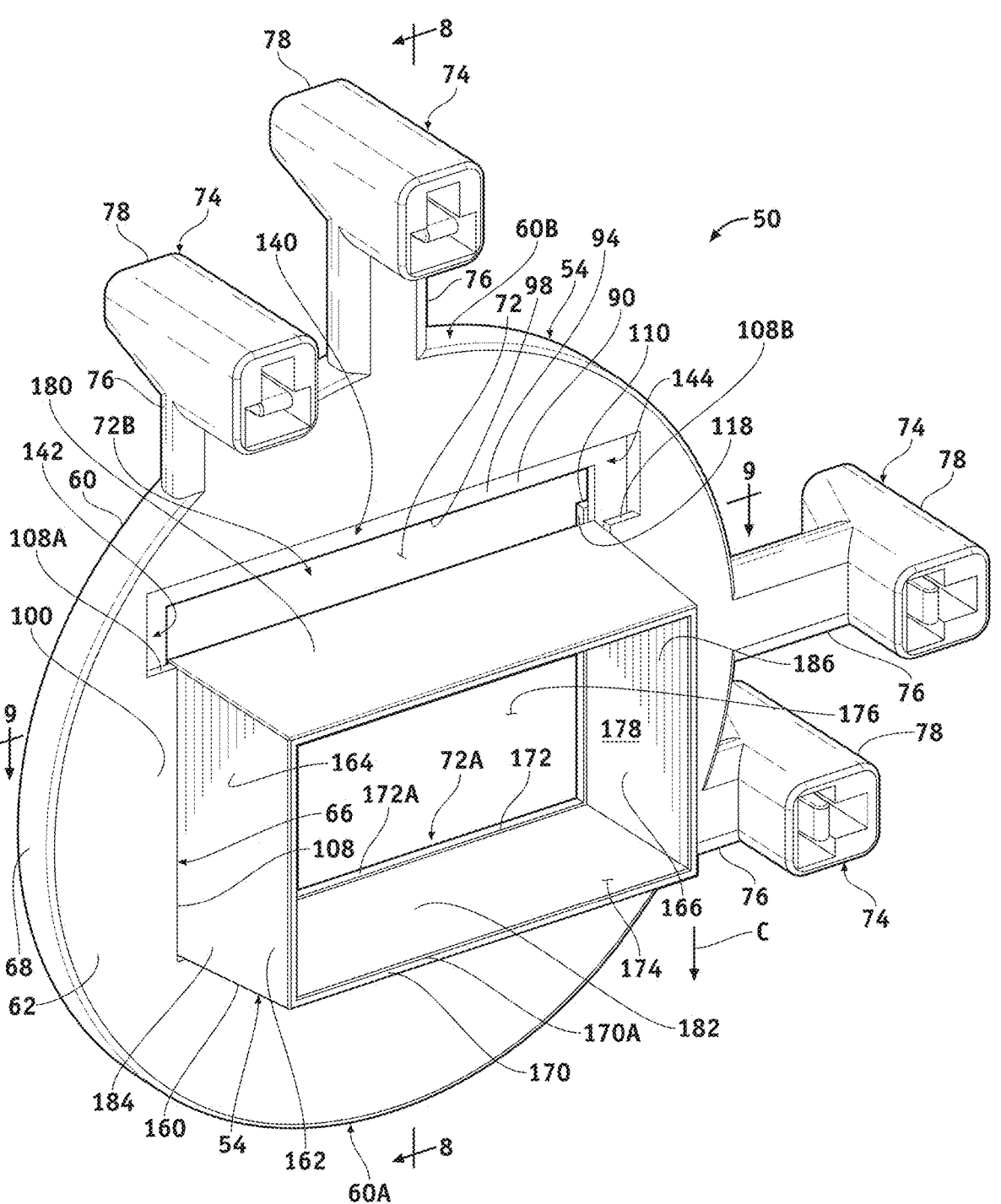
FIG. 2 is a rear perspective view of the embodiment of FIG. 1.

Turning now to the drawings, in which like reference characters indicate corresponding elements throughout the several views, attention is first directed to FIGS. 1 and 2, perspective views of an X-ray aiming ring apparatus 50 including an assembly of an aiming ring 52 and a connector 54. The aiming ring 52 and the connector 54 are adapted to be connected releasably, allowing them to be repeatedly assembled and disassembled without requiring specialized knowledge, skill, or tools. The connector 54 is a mechanical interface between the aiming ring 52 and an X-ray machine position-indicating tube to axially align the apparatus 50 and an image receptor mechanically connected to the aiming ring 52 along an X-ray beam centerline of the X-ray machine position-indicating tube to facilitate accurate and efficient X-ray imaging. The aiming ring 52 and the connector 54 are made of plastic or radiolucent polymer materials to ensure they do not interfere with the X-ray image while providing durability and lightweight handling.

Figure 3:
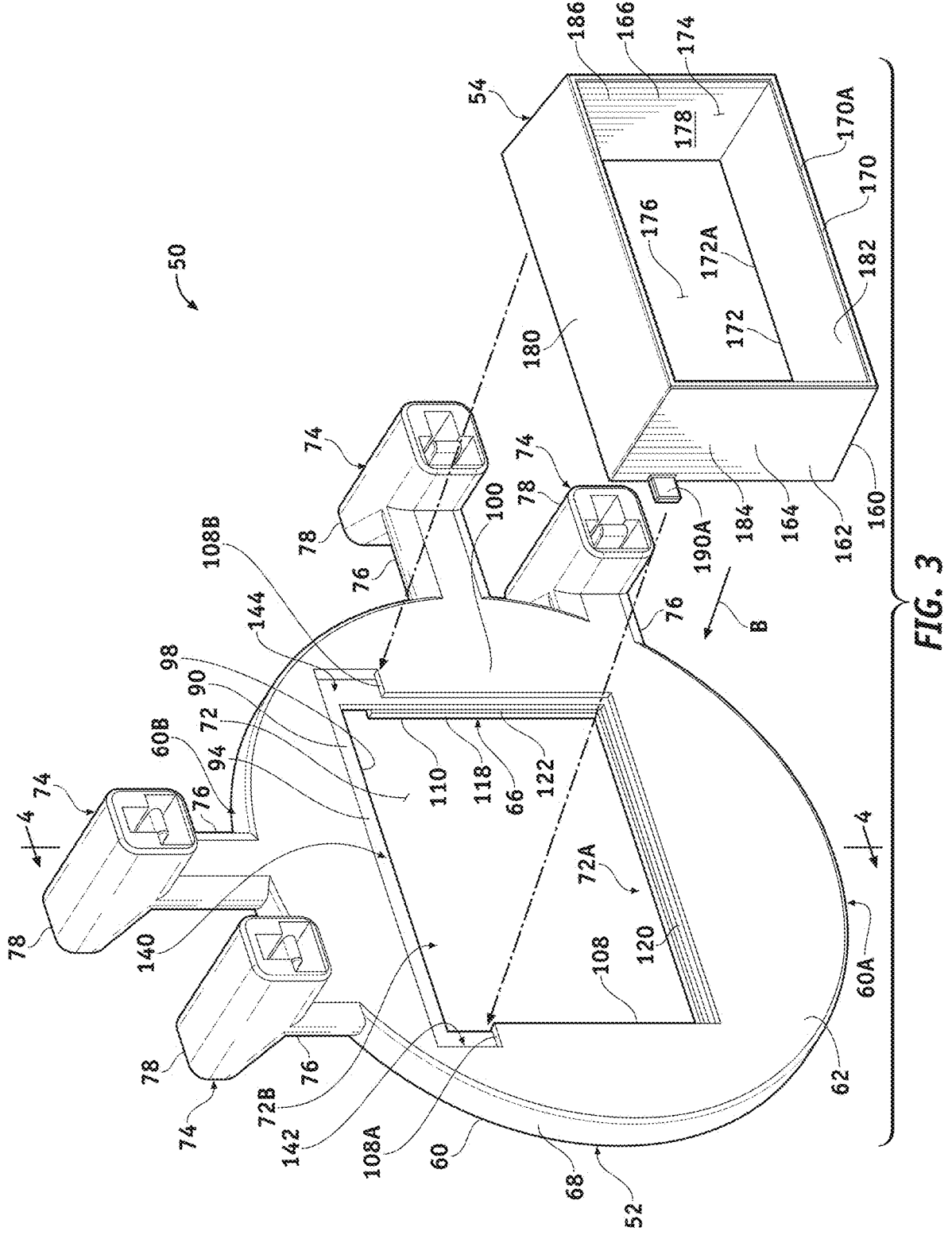
FIG. 3 is a view corresponding to FIG. 2, illustrating the aiming ring detached from the connector.
Figure 4:
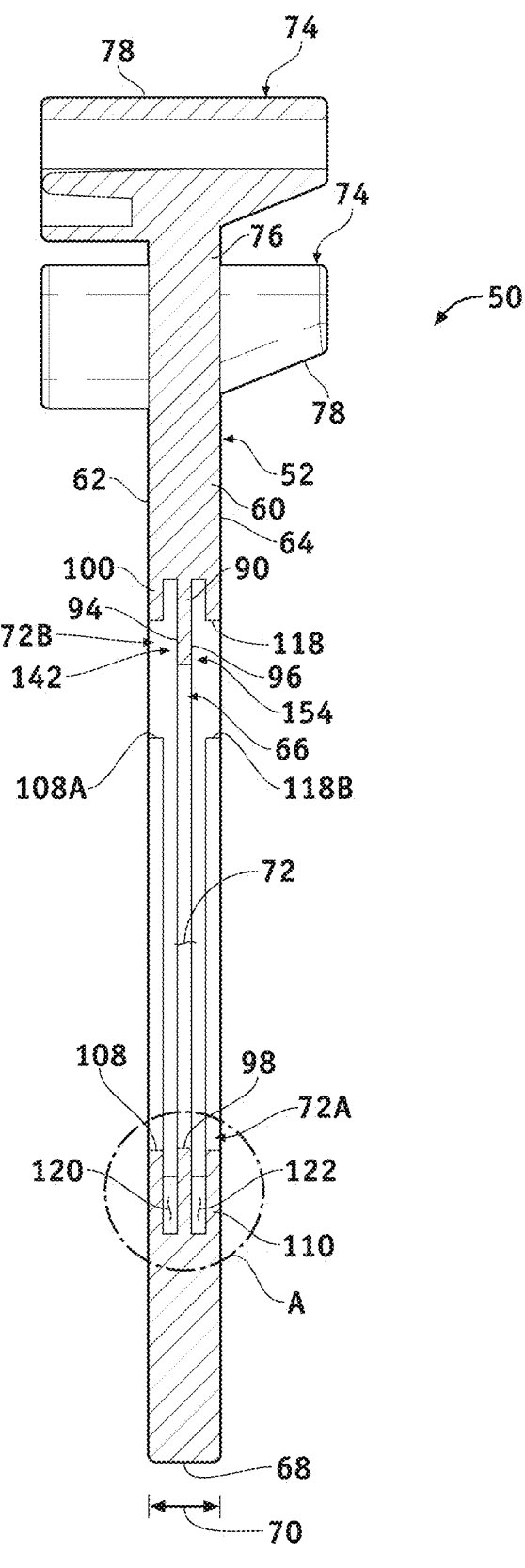
FIG. 4 is a section view taken along line 4-4 of FIG. 3.

Referring relevantly to FIGS. 1, 2, 3, and 4, FIG. 3 illustrating the aiming ring 52 detached from the connector 54 and FIG. 4 being a section view taken along line 4-4 of FIG. 3, the aiming ring 52 has no moving parts and consists of a body 60. The body 60 is disc-shaped with opposed surfaces 62 and 64 extending radially outward from an inner peripheral extremity 66 to an outer peripheral extremity 68. The body 60 has a thickness 70 from surface 62 to surface 64. For reference purposes, the body 60 has a lower end or extremity, generally denoted at 60A, and an opposed upper end or end 60B, generally denoted at 60B. The inner peripheral extremity 66 defines an opening 72 through the thickness 70 of the body 60 from surface 62 to surface 64. For reference purposes, the opening 72 has a lower area or region, generally denoted at 72A, and an opposed upper area or region, generally denoted at 72B. The lower region 72A is adjacent to the body's 60 lower end 60A. The upper region 72B is adjacent to the body's 60 upper end 60B. The opening extends upright from the lower region 72A to the upper region 72B. The opening 72 the inner peripheral extremity 66 defines is rectangular, having a horizontal dimension along a horizontal axis of the body 60 and a vertical dimension along a vertical axis of the body 60 from the lower end 60A to the upper end 60B, the horizontal dimension being greater than the vertical dimension. Connected to the body's 60 outer peripheral extremity 68 are standard connectors 74, each used to secure a positioning arm connected to an image receptor using standard methods. The connectors 74 are spaced apart circumferentially and are identical, each including an arm 76 coupled between the outer peripheral extremity 68 and a standard coupling 78 configured to receive and secure an end of a positioning arm connected to an image receptor. The aiming ring 52 has four connectors 74 and can have one or more as desired.

Figure 5:
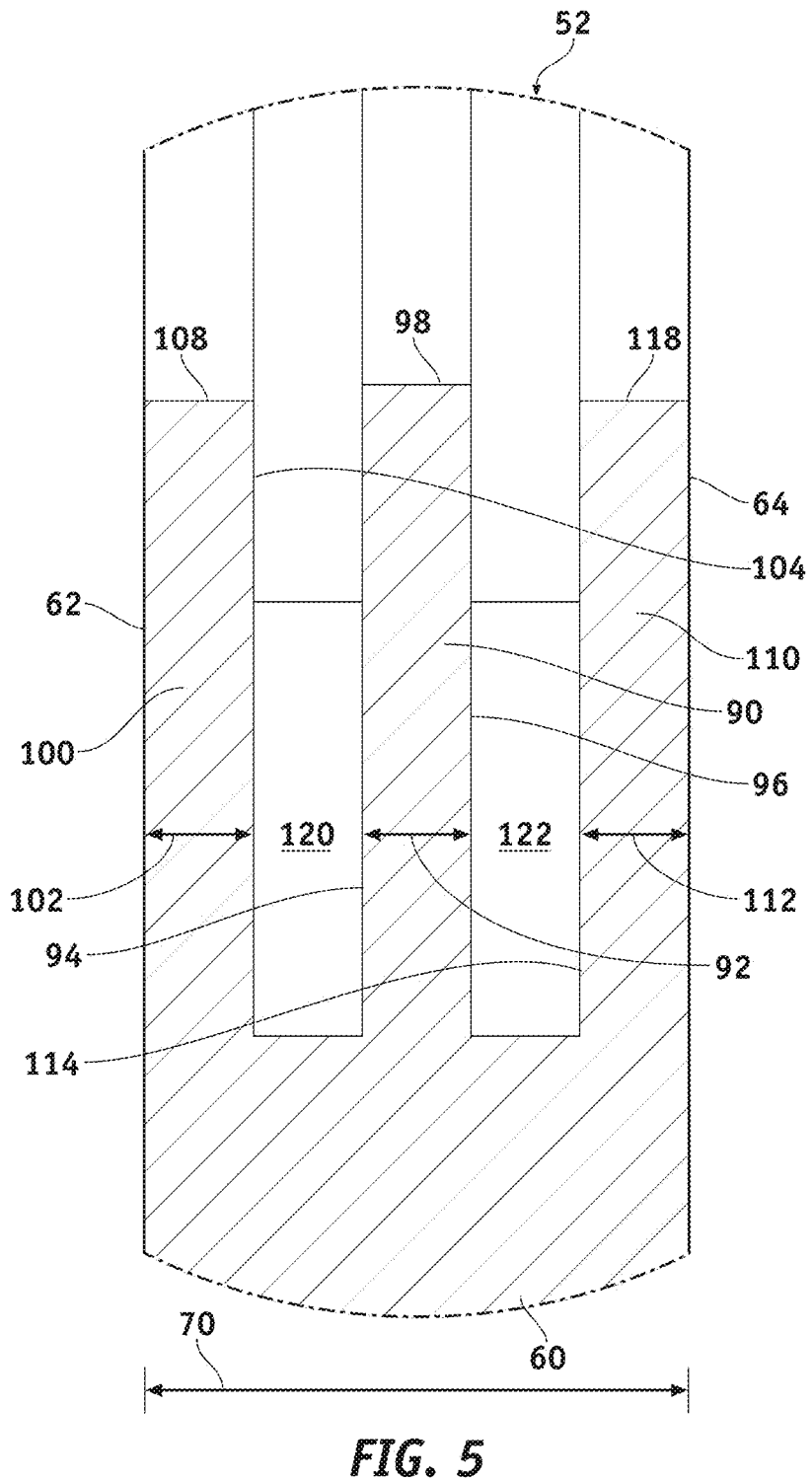
FIG. 5 is an enlarged view of circled area A of FIG. 4.
Figure 6:
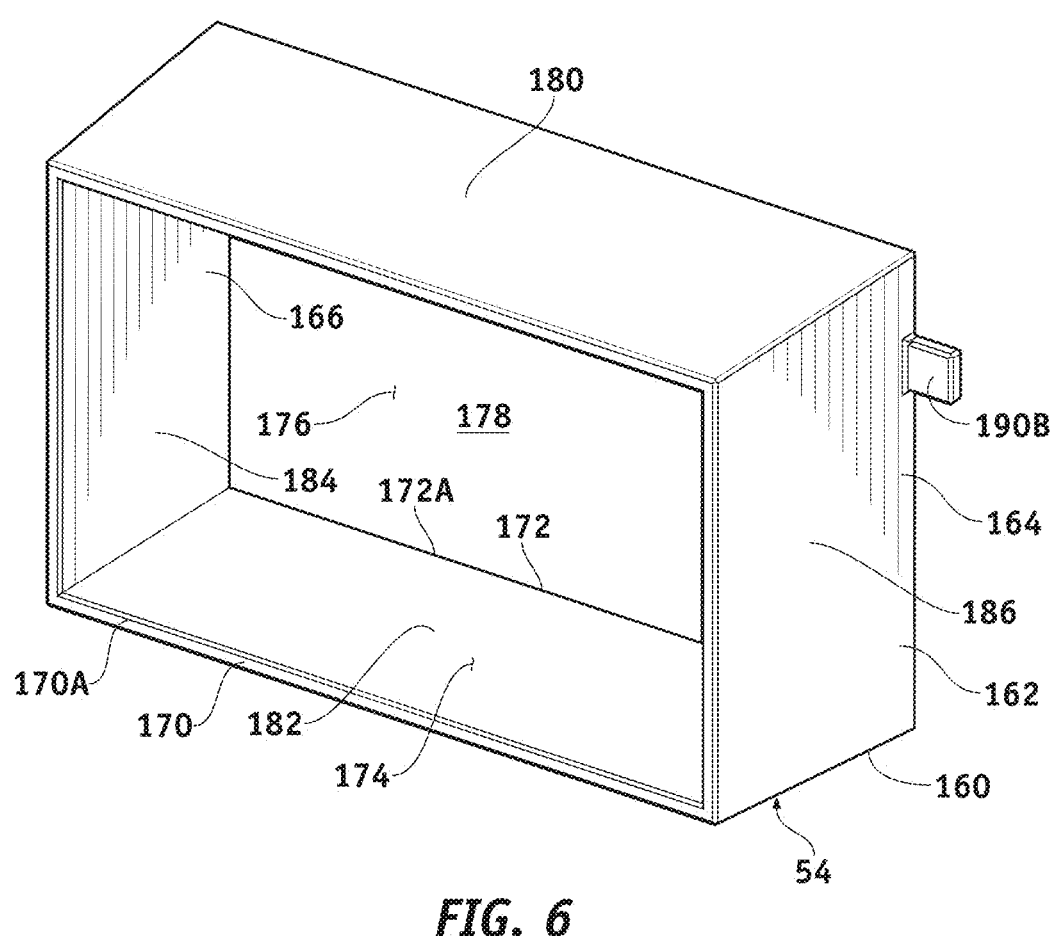
FIG. 6 is an upper rear perspective view of the connector of FIG. 3.
Figure 7:
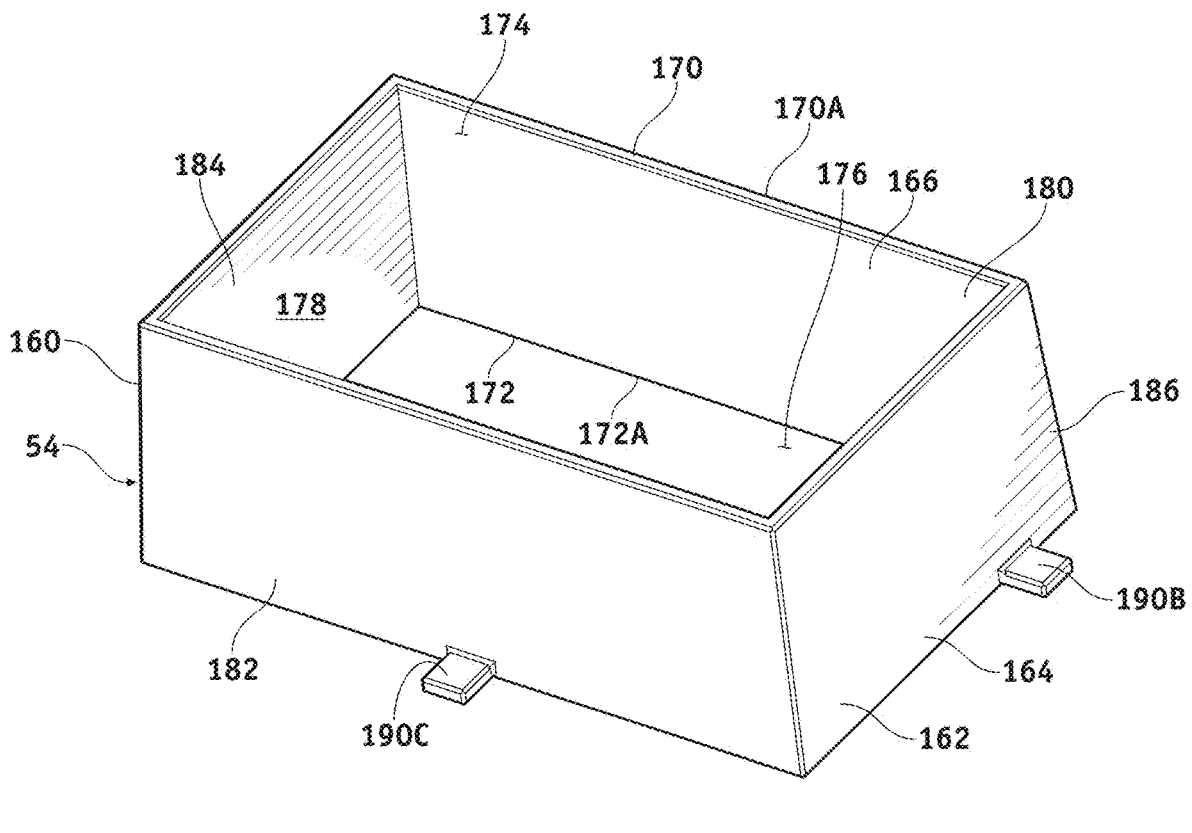
FIG. 7 is a lower rear perspective view of the connector of FIG. 3.

Referring relevantly to FIGS. 3, 4, and 5, the inner peripheral extremity 66 encircling and defining the opening 72 through the thickness 70 of the body 60 from surface 62 to surface 64 includes an annular intermediate flange 90, an annular outer flanges 100 and 110, and grooves 120 and 122. The outer flanges 100 and 110 are identical in every respect. The grooves 120 and 122 are identical in every respect. The intermediate flange 90 is between the outer flanges 100 and 110. The groove 120 is formed by and between the intermediate flange 90 and the outer flange 100. The groove 122 is formed by and between the intermediate flange 90 and the outer flange 110. In FIG. 5, the intermediate flange 90, the outer flanges 100 and 110, and the grooves 120 and 122 are parallel to each other. The intermediate flange 90 encircling the opening 72 has an axial thickness 92 between its opposed radial surfaces 94 and 96, the outer flange 100 encircling the opening 72 has an axial thickness 102 between its radial inner surface 104 and the surface 62 of the body 60, and the outer flange 110 encircling the opening 72 has an axial thickness 112 between its radial inner surface 114 and the surface 64 of the body 60. The axial thicknesses 92, 102, and 112 are the same. The groove 120 encircling the opening 72 is formed by and between the surface 94 of the intermediate flange 90 and the inner surface 104 of the outer flange 100. The groove 122 encircling the opening 72 is formed by and between the surface 96 of the intermediate flange 90 and the inner surface 114 of the outer flange 110. The intermediate flange 90 extends radially inward toward the opening 72 to its peripheral edge 98 encircling the opening 72. The outer flange 100 extends radially inward toward the opening 72 to its annular peripheral edge 108 encircling the opening 72. The outer flange 110 extends radially inward toward the opening 72 to its annular peripheral edge 118 encircling the opening 72. The intermediate flange 90 extends proud relative to the outer flanges 100 and 110, meaning it extends radially inward into the opening 72 slightly beyond the peripheral edges 108 and 118 of the respective outer flanges 100 and 110 to its annular peripheral edge 98, as shown in FIG. 5. The groove 120 extends radially inward to the opening 72 and opens to the opening 72 between the peripheral edge 98 of the intermediate flange 90 and the peripheral edge 108 of the outer flange 110. The groove 122 extends radially inward to the opening 72 and opens to the opening 72 between the peripheral edge 98 of the intermediate flange 90 and the peripheral edge 118 of the outer flange 110.

In FIG. 3, the inner peripheral edge 108 of the outer flange 100 has a profile along the opening's 72 upper region 72B between either side of the opening 72. This inner peripheral edge 108 profile forms a cutout 140 in the outer flange 100. The cutout 140 extends between either side of the opening's 72 upper region 72B. The cutout 140 defines ledges 108A and 108B in the inner peripheral edge 108 and pockets 142 and 144. The ledge 108A and the pocket 142 defined by the profile of the inner peripheral edge 108 are on one side of the opening's 72 upper region 72B and the ledge 108B and the pocket 144 defined by the profile of the inner peripheral edge 108 are on the opposite side of the opening's 72 upper region 72B. The cutout 140 opens to the surface 94 of the intermediate flange 90 extending across the opening's 72 upper region 72B from the pocket 142 to the pocket 144. The pocket 142 is above the ledge 108A and is open to groove 120. The pocket 144 is above the ledge 108B and is open to the groove 120. The pocket 142 opens downward to the groove 120 between the ledge 108A and the surface 94 of the intermediate flange 90. The pocket 144 opens downward to the groove 122 between the ledge 108B and the surface 94 of the intermediate flange 90.

The profile of the outer flange 110 along the opening's 72 upper region 72B between either side of the opening 72 is the same as the outer flange's 100 profile. In FIG. 1, the inner peripheral edge 118 profile forms a cutout 140 in the outer flange 100. The cutout 140 extends between either side of the opening's 72 upper region 72B. The cutout 140 defines ledges 118A and 118B in the inner peripheral edge 118 and pockets 152 and 154. The ledge 118A and the pocket 152 are on one side of the opening's 72 upper region 72B and the ledge 118B and the pocket 154 are on the opposite side of the opening's 72 upper region 72B. The cutout 140 opens to the surface 94 of the intermediate flange 90 extending across the opening's 72 upper region 72B from the pocket 152 to the pocket 154. The pocket 152 is above the ledge 118A and open to groove 122. The pocket 154 is above the ledge 118B and open to the groove 122. The pocket 152 opens downward to the groove 122 between the ledge 118A and the surface 94 of the intermediate flange 90. The pocket 154 opens downward to the groove 122 between the ledge 118B and the surface 94 of the intermediate flange 90.

Referring relevantly to FIGS. 3, 4, 6, and 7, the connector 72 has no moving parts and is a hollow body 160. The hollow body 160 is a continuous sidewall 162 having an outer surface 164, an inner surface 166, and opposed extremities 170 and 172. The extremity 170 is a rim 170A that encircles an inlet 174 at the inlet end of the hollow body 160. The extremity 172 is a rim 172A that encircles an outlet 176 at the outlet end of the hollow body 160. The inner surface 166 defines an X-ray beam channel 178 through the hollow body 160 from the inlet 174 to the outlet 176. The inlet 174 and the outlet 176 are parallel to each other. The outlet 176 is larger than the inlet 174 and the continuous sidewall 162 and its outer and inner surfaces 164 and 166 and the X-ray beam channel 178 taper from the outlet 176 to the inlet 174 and, thus, widen from the inlet 174 to the outlet 176. In this embodiment, the hollow body 160 is a rectangular frustum, in which the continuous sidewall 162 has four trapezoidal walls 180, 182, 184, and 186 extending from the rectangular outlet 176 defined by the rectangular rim 172A of the extremity 172 to the comparatively smaller inlet 174 defined by the rectangular rim 170A of the extremity 170. The walls 180 and 182, the opposed upper and lower walls of the hollow body 160, extend between the walls 184 and 186, the opposed end walls of the hollow body 160. The equal-length walls 180 and 182 and the respective upper and lower ends of the hollow body 160 are longer than the equal-length walls 184 and 186 and the opposed ends of the hollow body 160. The inner surface 166 following the trapezoidal walls 180, 182, 184, and 186 defines the rectangular frustoconical shape of the channel 176 tapering from the outlet 176 to the inlet 174 and, thus, widening from the inlet 174 to the outlet 176.

The aiming ring 52 and the connector 54 are configured to be assembled to form the apparatus 50, an integrated unit.

Specifically, the aiming ring 52 and the connector 54 have interconnecting portions configured to connect the connector's 54 extremity 172 to the aiming ring 52 to form the apparatus 50 in FIGS. 1 and 2. The interconnecting portions are male portions configured to interconnect corresponding female portions. In the present embodiment, the connector 54 has the male portions and the aiming ring 52 has the female portions. The relative positioning of male and female portions can be selectively reversed or mixed and matched in alternate embodiments. As described below, the male portions are projections or tabs and the corresponding female portions are corresponding groove portions configured to tightly receive the respective tabs.

The hollow body 160 has the tabs 190, the male portions of the interconnecting portions. The tabs 190 are identical, spaced apart circumferentially, extend outward from the outer surface 164 of the hollow body 160 adjacent to the rim 172A at the outlet end of the hollow body 160, and are dimensioned to be tightly received by corresponding groove portions of the groove 120 and the groove 122 as described herein. In this example, the hollow body has three tabs 190A, 190B, and 190C. The tab 190A extends outward from the outer surface 164 of the end wall 184 adjacent to the rim 172A and near the upper wall 180 at the upper end of the hollow body 160. The tab 190B extends outward from the outer surface 164 of the end wall 186 adjacent to the rim 172A and near the upper wall 180 at the upper end of the hollow body 160. The tab 1900, in turn, extends outward from the outer surface 164 of the lower wall 182 adjacent to the rim 172A at the lower end of the hollow body 160 at an intermediate location between the opposed ends walls 184 and 186.

Figure 8:
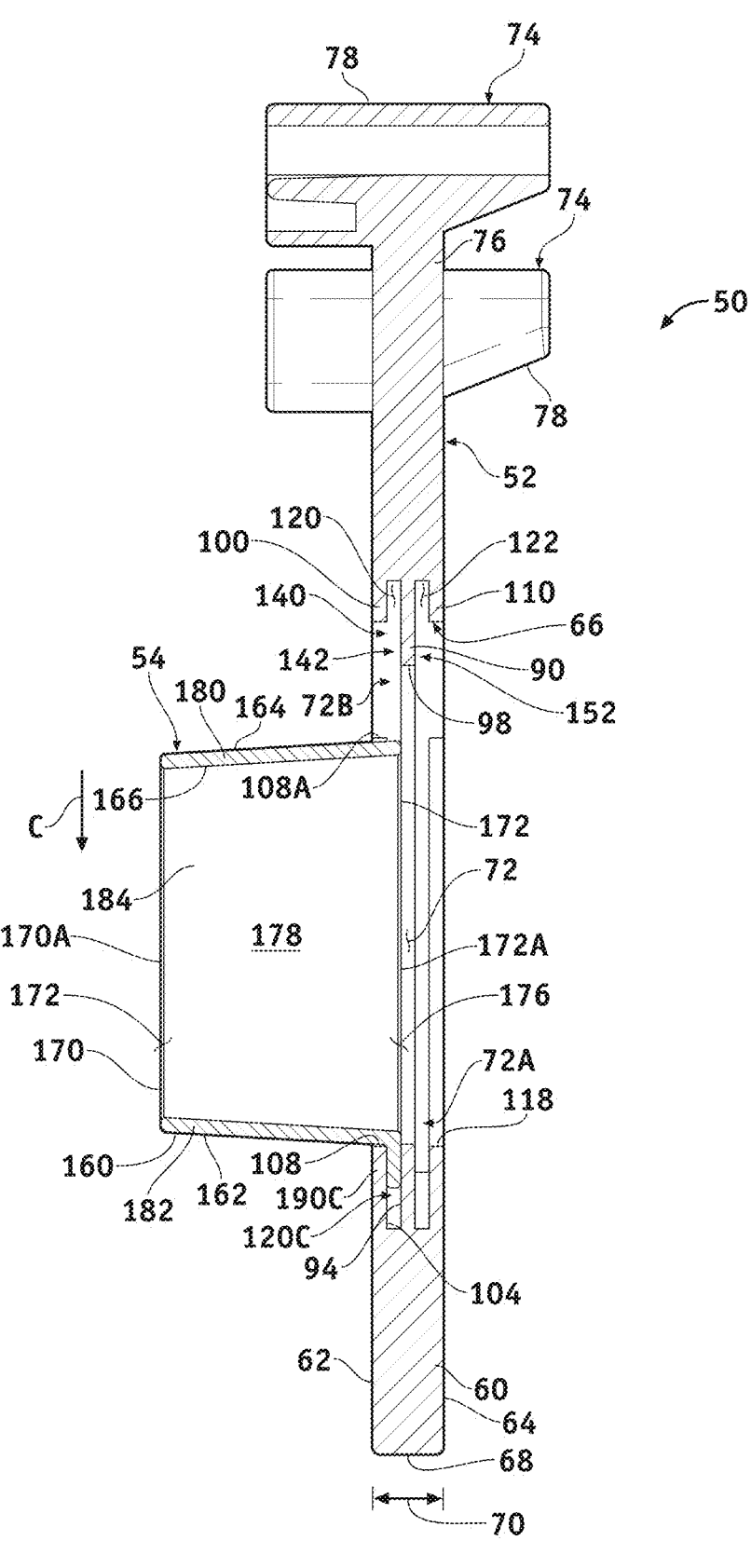
FIG. 8 is a section view along line 8-8 of FIG. 2.
Figure 9:
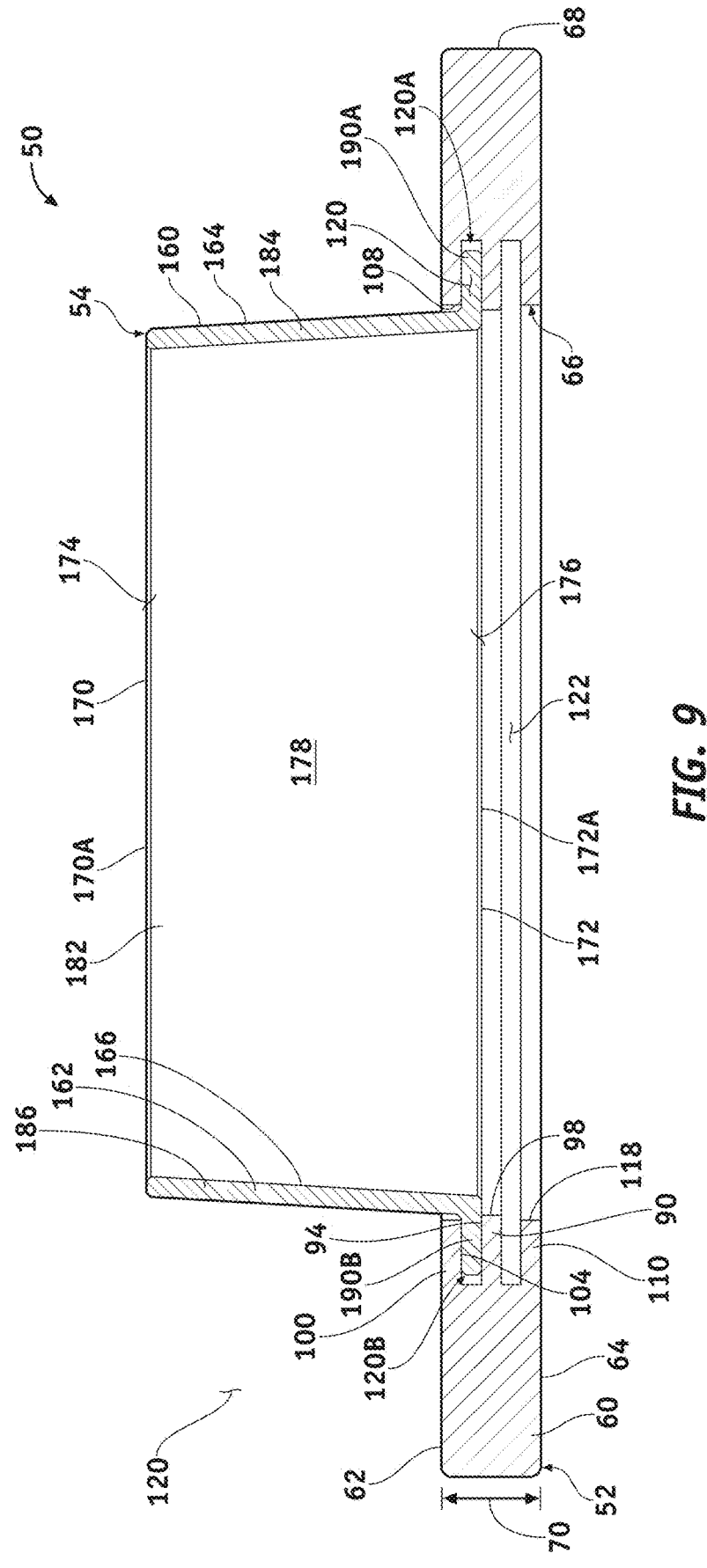
FIG. 9 is a section view along line 9-9 of FIG. 2.

The assembly of the aiming ring 52 and the connector 54 forms the X-ray aiming ring apparatus 50 in FIGS. 1 and 2. The relative sizing of aiming ring 52 and the connector 54 enable their assembly in the following manner. In FIG. 3, a worker assembles the aiming ring 52 and the connector 54 by holding the aiming ring 52 upright from its lower end 60A to its upper end 60B. He locates the connector 54 on the surface 62 side of the aiming ring 52, holding it upright from its lower wall 182 to its upper wall 180, aligning the outlet 176 of the connector 54 with the aiming ring's 52 opening 72, and registering the tabs 190A and 190B with the respective pockets 142 and 144 on either side of the upper region 72B of the opening 72. He advances the connector 54 toward the opening 72 in the direction of arrow B, inserting the extremity 172 into the opening 72 through the surface 62 to locate the tabs 190A and 190B in the respective pockets 142 and 144 above the respective ledges 108A and 108B and against the surface 94 of the intermediate flange 90 open to the respective pockets 142 and 144, and engage the connector's 54 rim 172A extending downward along the end walls 184 and 186 from the respective tabs 190A and 190B and across the lower end wall 182 directly against the confronting portions of the surface 96 of the intermediate flange 90, disabling the connector 54 from moving into the opening 72 beyond the intermediate flange 90. This initially fits the connector's 54 extremity 172, the outlet end of the connector 54, in the opening 72 encircled by the peripheral edge 108 of the outer flange 100 and the groove 120 between the outer flange 100 and the intermediate flange 90 and registers the connector's 54 tabs 190A, 190B, and 190C with opposing corresponding groove portions 120A, 120B, and 120C of the groove 120, the tab 190A registered with its tightly-fitting groove portion 120A of the groove 120 open to the pocket 142 between the ledge 108A and the surface 96 of the intermediate flange 90, the tab 190B registered with its tightly-fitting groove portion 120B of the groove 120 open to the pocket 144 between the ledge 108B and the surface 96 of the intermediate flange 90, and the tab 190C registered with its tightly-fitting groove portion 120C of the groove 120 open to the opening 72 between the ledges 108A and 108B at the lower region 72B of the opening 72. The groove portions 120A, 120B, and 120C are the female portions of the interconnecting portions. The worker interconnects the tabs 190A, 190B, and 190C with the respective groove portions 120A, 120B, and 120C by shifting the connector 54 downward relative to the aiming ring 52 in the direction of arrow C in FIGS. 1, 2, 3, and 8 with a force sufficient to forcibly insert the tab 190A tightly into the groove portion 120A in FIG. 9 through the opening to the portion 120A between the ledge 108A and the surface 96 of the intermediate flange 90, the tab 190B tightly into the groove portion 120B in FIG. 9 through the opening to the portion 120B between the ledge 108B and the surface 96 of the intermediate flange 90, and, as shown in FIG. 9, the tab 190C tightly into the groove portion 120C of the groove 120 open to the opening 72 at the lower region 72B of the opening 72, settling the outer surface 164 of the lower wall 182 in direct contact against the underlying portion of the outer flange's 100 peripheral edge 108 at the lower region 72B of the opening 72 in FIG. 8, securing the connector 54 to the aiming ring 52 releasably to form the apparatus 50. The inner surface 94 of the outer flange 100 and the opposing surface 94 of the intermediate flange 90 squeeze tightly against the tabs 190A, 190B, and 190C when they are inserted into their respective groove portions 120A, 120B, and 120C, frictionally securing the tabs 190A, 190B, and 190C to the respective groove portions 120A, 120B, and 120C. The interconnected tab 190A and groove portion 120A in FIG. 9, the interconnected tab 190B and groove portion 120B in FIG. 9, and the interconnected tab 190C and groove portion 120C in FIG. 8 secure the connector 54 to the aiming ring 52 releasably to form the integrated unit consisting of the assembled aiming ring 52 and connector 54. The worker can reverse this assembly operation to detach the connector 54 from the aiming ring 52. The open groove portions 120A, 120B, and 120C enable the withdrawal of the respective tabs 190A, 190B, and 190C to detach the extremity 172 of the connector 54 from the aiming ring 52, the tab 190A outward from the groove portion 120A in FIG. 9 through the opening to the portion 120A between the ledge 108A and the surface 96 of the intermediate flange 90, the tab 190B outward from the groove portion 120B in FIG. 9 through the opening to the portion 120B between the ledge 108B and the surface 96 of the intermediate flange 90, and the tab 190C outward through the groove portion 120C open to the opening 72 at the lower region 72B of the opening 72.

The now assembled aiming ring 52 and connector 54 form the X-ray aiming ring apparatus 50 in FIGS. 1, 2, 8, and 9. Referring relevantly to FIGS. 1, 2, 8, and 9, the connector 54 of the apparatus 50 extends outward to the extremity 170 at the inlet end of the connector 54 from the extremity 170 at the outlet end of the connector 54 connected to the aiming ring 52, with the connector's 54 outlet 176 open to the opening 72. The connector's 54 X-ray beam channel 178 is open to the opening 72 by the outlet 176. The continuous sidewall 162 and its outer and inner surfaces 164 and 166 and the X-ray beam channel 178 taper from the outlet 176 to the comparatively smaller inlet 174 and, thus, widen from the inlet 174 to the comparatively larger outlet 176. The inlet 174, the outlet 176 and the opening 72 are parallel to each other.

Figure 10:
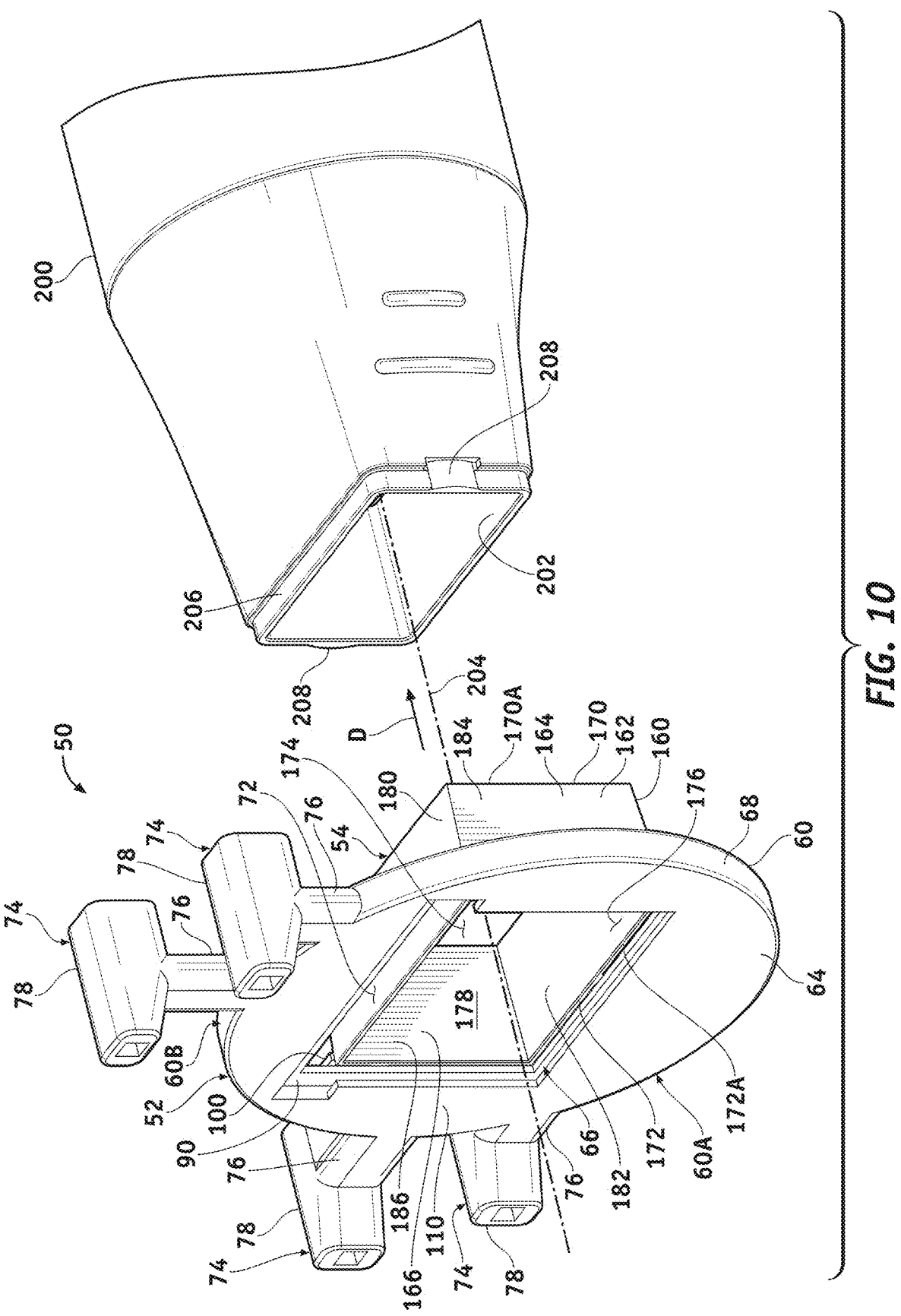
FIG. 10 is a front perspective view of the X-ray aiming ring apparatus of FIGS. 1 and 2 shown detached from an X-ray machine position-indicating tube.
Figure 11:
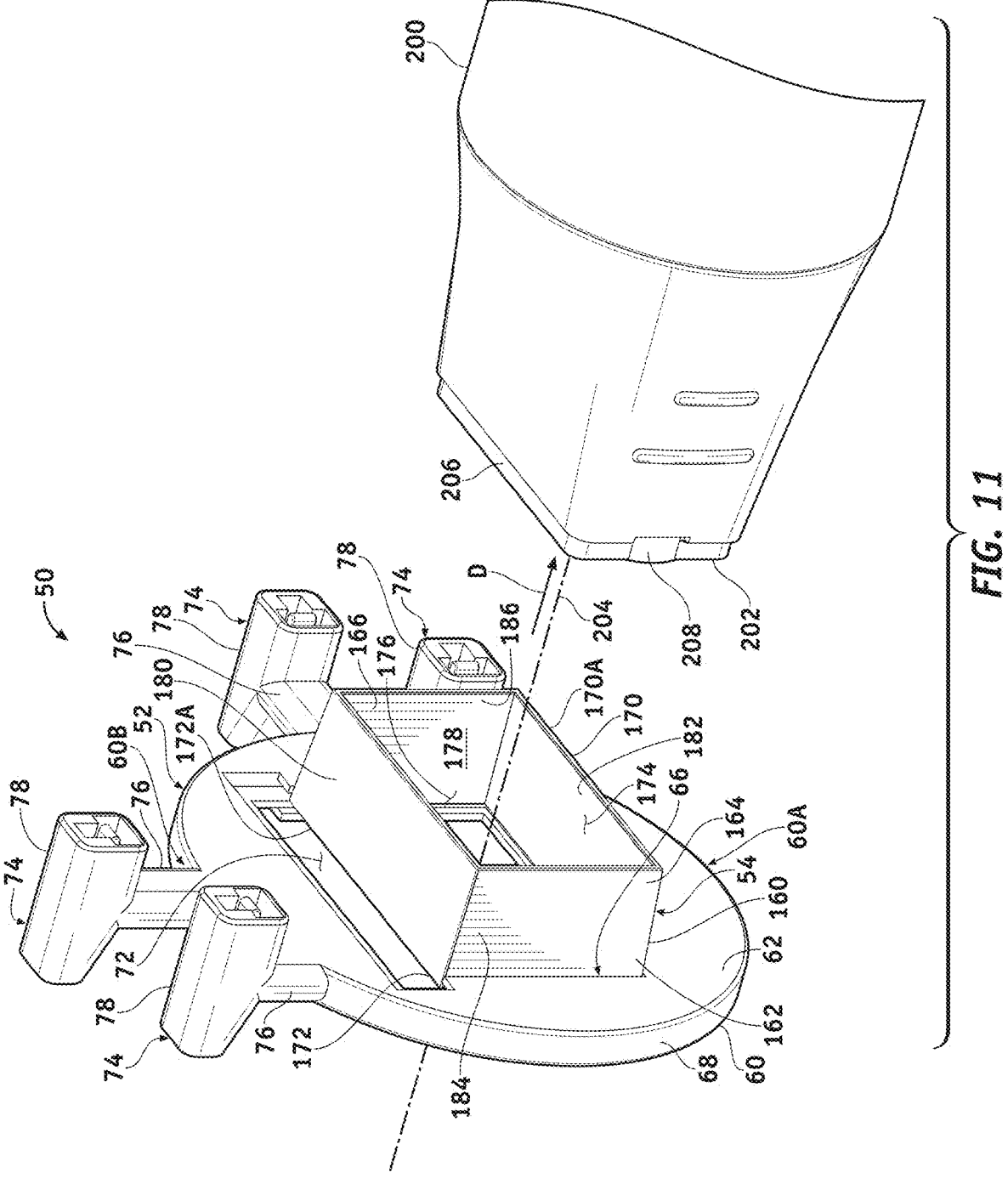
FIG. 11 is a rear perspective view of the embodiment of FIG. 10.

Referring to FIGS. 10 and 11, shown is an X-ray machine position-indicating tube 200 with an open discharge end 202 formed with an outward-facing annular recess 206, the tube 200 and the open discharge end 202 arranged about an X-ray beam centerline 204 along which the X-ray beam generated by an X-ray machine travels outward from the tube's 200 open discharge end 202. The apparatus 50 is configured to be attached or otherwise connected releasably to the tube 200, allowing them to be repeatedly assembled to form an X-ray aiming ring setup 210 in FIGS. 12-15 and disassembled.

The extremity 170 at the inlet end of the connector 54 is configured to connect mechanically to the tube 200 to open the X-ray beam channel 178 to the open discharge end 202 by the inlet 174 and axially align the open discharge end 202, the inlet 174, the X-ray beam channel 178, and the outlet 176 to the aiming ring's 52 opening 72 along the X-ray beam centerline 204 along which the X-ray beam generated by the X-ray machine travels from the tube's 200 open discharge end 202 to axially align an image receptor supported on the outer side of the aiming ring's 52 surface 64 by a positioning arm connected to the coupling 78 of one of the connectors 74 along the X-ray beam centerline 204 to effect accurate and efficient X-ray imaging.

In FIGS. 10 and 11, the worker connects the apparatus 50 to the tube 202 by holding the apparatus 50 upright from its lower end 60A to its upper end 60B. He locates the open discharge end 202 of the tube 200 on the surface 62 side of the aiming ring 52, axially aligning the open discharge end 202 with the connector's 54 inlet 174, axially aligning the X-ray beam channel 178 about the tube's X-ray beam centerline 204. He advances apparatus 50 toward the tube's 200 open discharge end 202 along the X-ray beam centerline 204 in the direction of arrow D to mechanically connect the connector's 54 extremity 170 to the tube 202 in FIGS. 12-14 by forcibly inserting the open discharge end 202 into the inlet 174 to fit the extremity's 170 rim 170A over the recess 206, frictionally securing the recess 206 in direct contact against the inward-facing inner surface 166 of the connector 54 adjacent to the rim 170A of the extremity 170 at the connector's 54 inlet end, forming the X-ray aiming ring setup 210. The extremity 170 at the inlet end of the connector 54 and the open discharge end 202 of the tube have corresponding sizes, enabling them to frictionally interconnect, as described, to mechanically connect the connector's 54 extremity 170 to the tube 202, locating the open discharge end 202 within the inlet 174. In FIG. 14, the open discharge end 202, the inlet 174, the outlet 176 and the opening 72 are parallel to each other in the setup 210.

Figure 12:
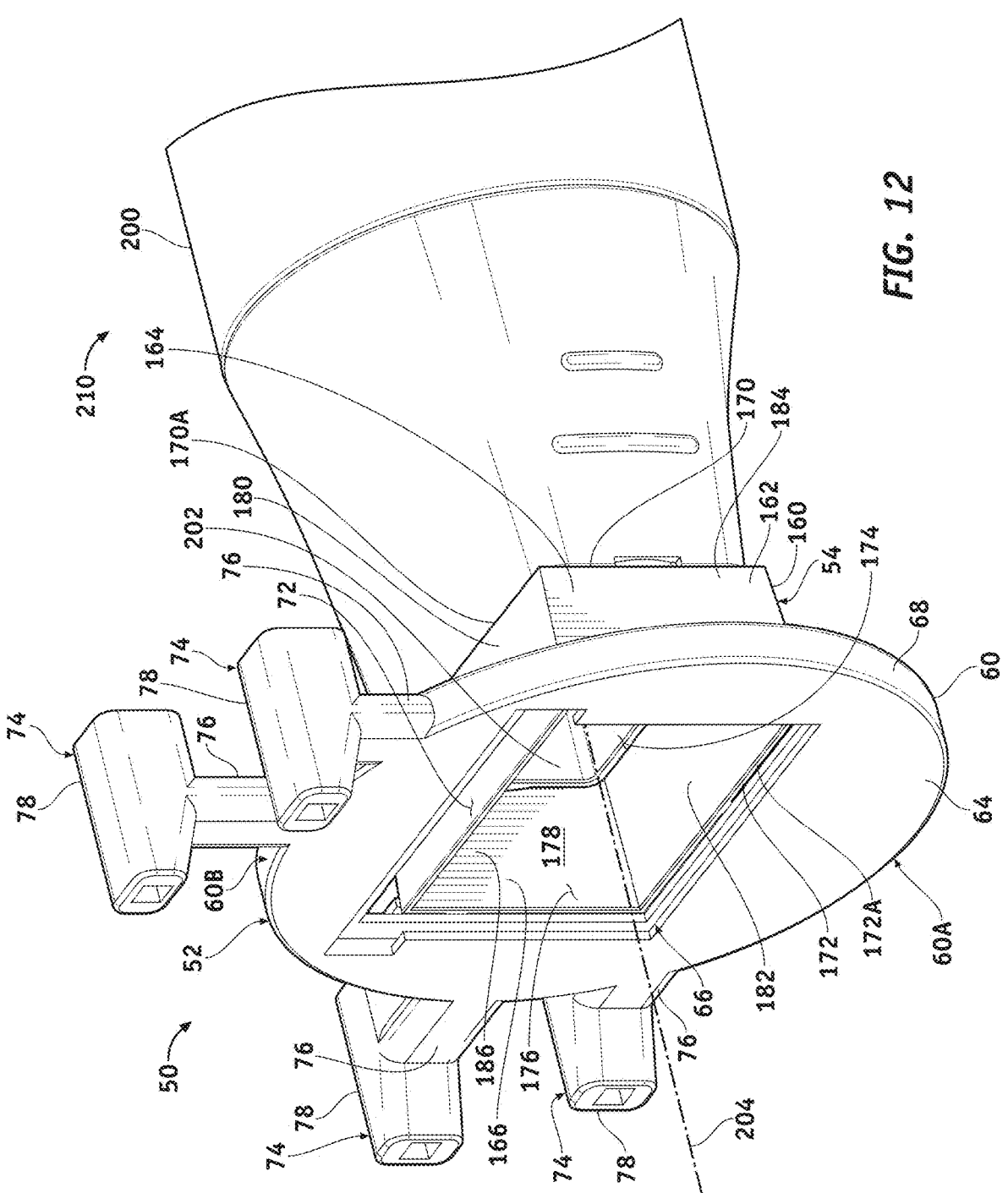
FIG. 12 is a view corresponding to FIG. 10, illustrating the X-ray aiming ring apparatus attached to the X-ray machine position-indicating tube, forming an X-ray aiming ring setup.
Figure 13:
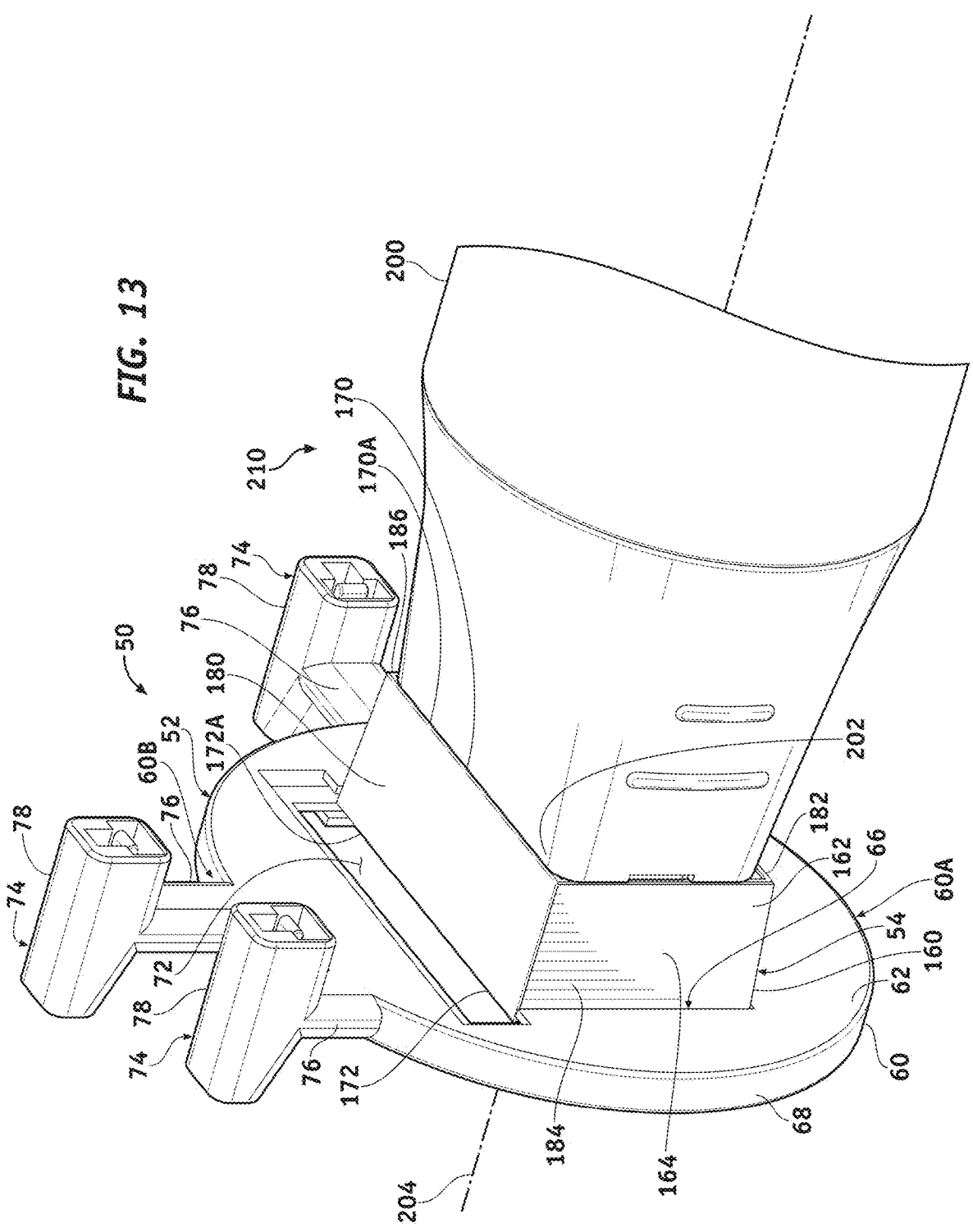
FIG. 13 is a rear perspective view of the embodiment of FIG. 12.
Figure 14:
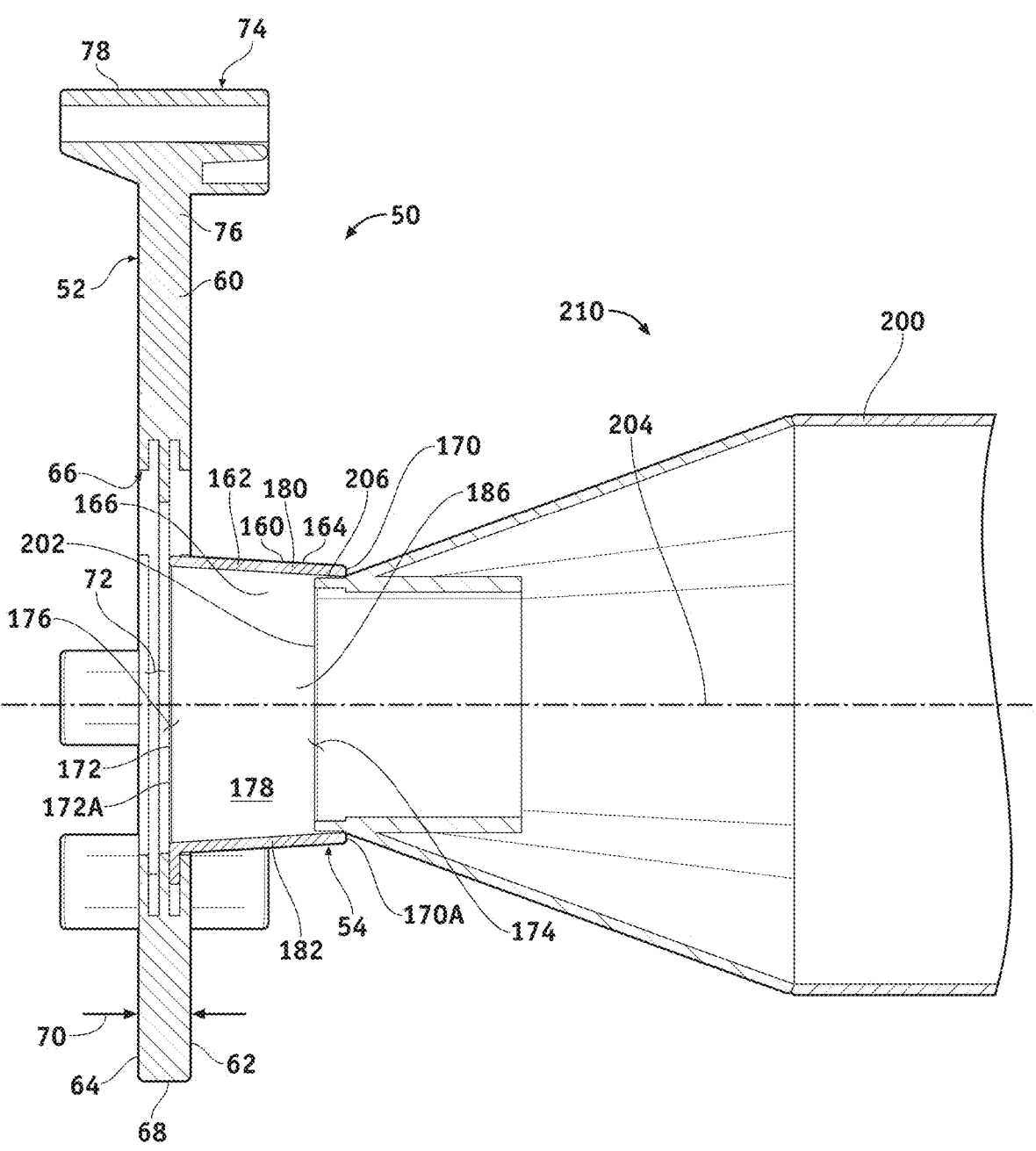
FIG. 14 is a section view taken along line 14-14 of FIG. 11.

Referring in relevant part to FIGS. 12-14, the connector 54 now connected mechanically between with the aiming ring 52 and the tube 200 is a mechanical interface between the aiming ring 52 and the tube 200, opening the connector's 54 X-ray beam channel 178 to the open discharge end 202 by the inlet 174 and axially aligning the open discharge end 202, the inlet 174, the X-ray beam channel 178, and the outlet 176 to the aiming ring's 52 outlet along the X-ray beam centerline 204 to effect accurate and efficient X-ray imaging. The open discharge end 202, the inlet 174, the X-ray beam channel 178 and the outlet 176 are centered along the X-ray beam centerline 204 in the setup 210. The mechanical connection of the aiming ring 52 to the tube 200 by the connector 54 facilitates accurate and efficient axially alignment of the aiming ring 52 to the open discharge end 202 and an image receptor 220 supported on the outer side of the aiming ring's 52 surface 64 by a positioning arm 222, connected to the coupling 78 of one of the connectors 74 in FIG. 15, along the X-ray beam centerline 204 along which the X-ray beam generated by the X-ray machine travels outward from the open discharge end 202, through the X-ray beam channel 178 of the connector 54 from its inlet 174 to its outlet 176 and outward through the aiming ring's 52 opening 72 from the connector's 54 outlet 176 to the image receptor 220 supported on the outer side of the aiming ring's 52 surface 64. This effectuates accurate and efficient X-ray imaging without having to make alignment adjustments between the interconnected tube 200 and apparatus 50.

In FIGS. 10 and 11, the recess 206 has outwardly projecting projections 208 to hasten the frictional engagement against the inner surface 166 of the connector 54 adjacent to the rim 170A of the extremity 170 at the connector's 54 inlet end when the open discharge end 202 is inserted into the connector's 54 inlet 174. The insertion of the open discharge end 202 into the inlet 174 ensures the outlet 174 does not interfere with the geometry of the open discharge end 202 that ensures that the X-ray beam passing through it to the X-ray beam channel 178 that widens from the inlet 174 to the outlet 176 is aligned into a parallel beam. How the X-ray beam channel 178 widens to the outlet 176 to the aiming ring's 52 opening 72 from the inlet 174 over the open discharge end 202 ensures that the connector 54 does not interfere or redirect the X-ray beam passing through it to the aiming ring's opening 72. The worker can separate the apparatus 50 from the tube 200 simply by pulling them apart.

Since the outer flanges 100 and 110 and the cutouts 140 and 150 are identical, a technician can alternately connect the connector 54 to the aiming ring 52 along the side 64 of the aiming ring 52 using the pockets 152 and 154 and interconnecting the tabs 190A, 190B, and 190C with corresponding groove portions of the groove 122. The resulting assembly of the aiming ring 52 and the connector 54 is otherwise the same as the apparatus 50 and is useful with the tube 200 in the same way as the setup 210 described above.

In FIG. 14, the rim 170A of the connector's 54 extremity 170 fits tightly over the outward-facing annular recess 206 formed in the open discharge end 202 of the tube 200 to mechanically connect the connector's 54 extremity 170 to the tube 200 by the direct contact of the connector's 54 inward-facing inner surface 166 against the tube's 200 outward-facing annular recess 206, locating the open discharge 202 end within the inlet 174. This is an insertion joint between the connector 54 and the tube 200, in which the tube's 200 open discharge end 202 is inserted into the inlet 174 of the connector's 54 extremity 170 that fits tightly over the tube 200 and, more specifically, over the tube's 200 outward-facing annular recess 206. Accordingly, in setup 210 the connector's 54 extremity 170 and the tube's 200 open discharge end 202 are configured to be inserted one into the other, the open discharge end 202 into the inlet 174 of the connector's 54 extremity 170, to connect the coupling 54 mechanically to the tube 200 by the frictional engagement between the connector 54 and the tube 200.

Figure 15:
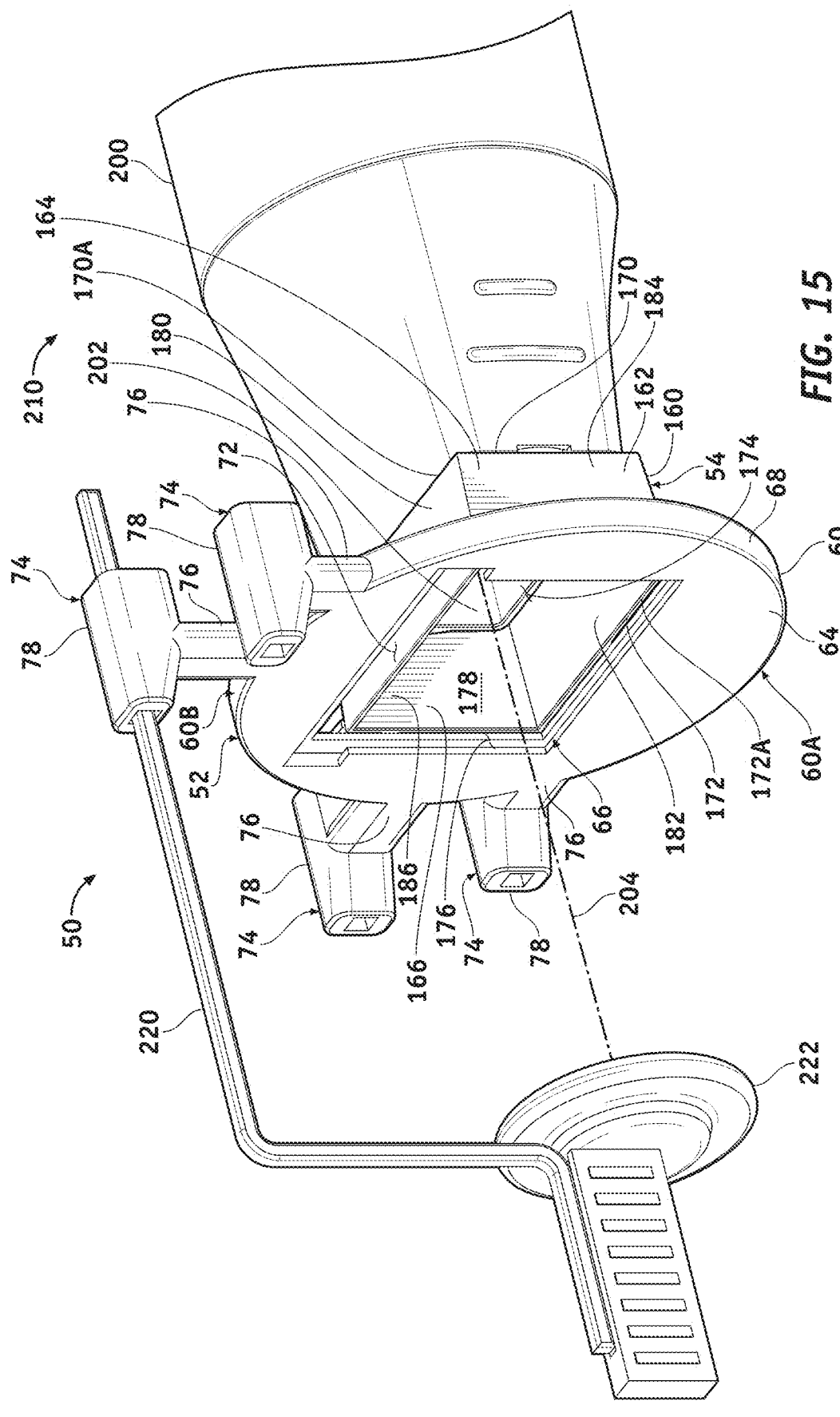
FIG. 15 is view corresponding to FIG. 12, illustrating an image receptor mechanically connected to the aiming ring by a positioning arm.
Figure 16:
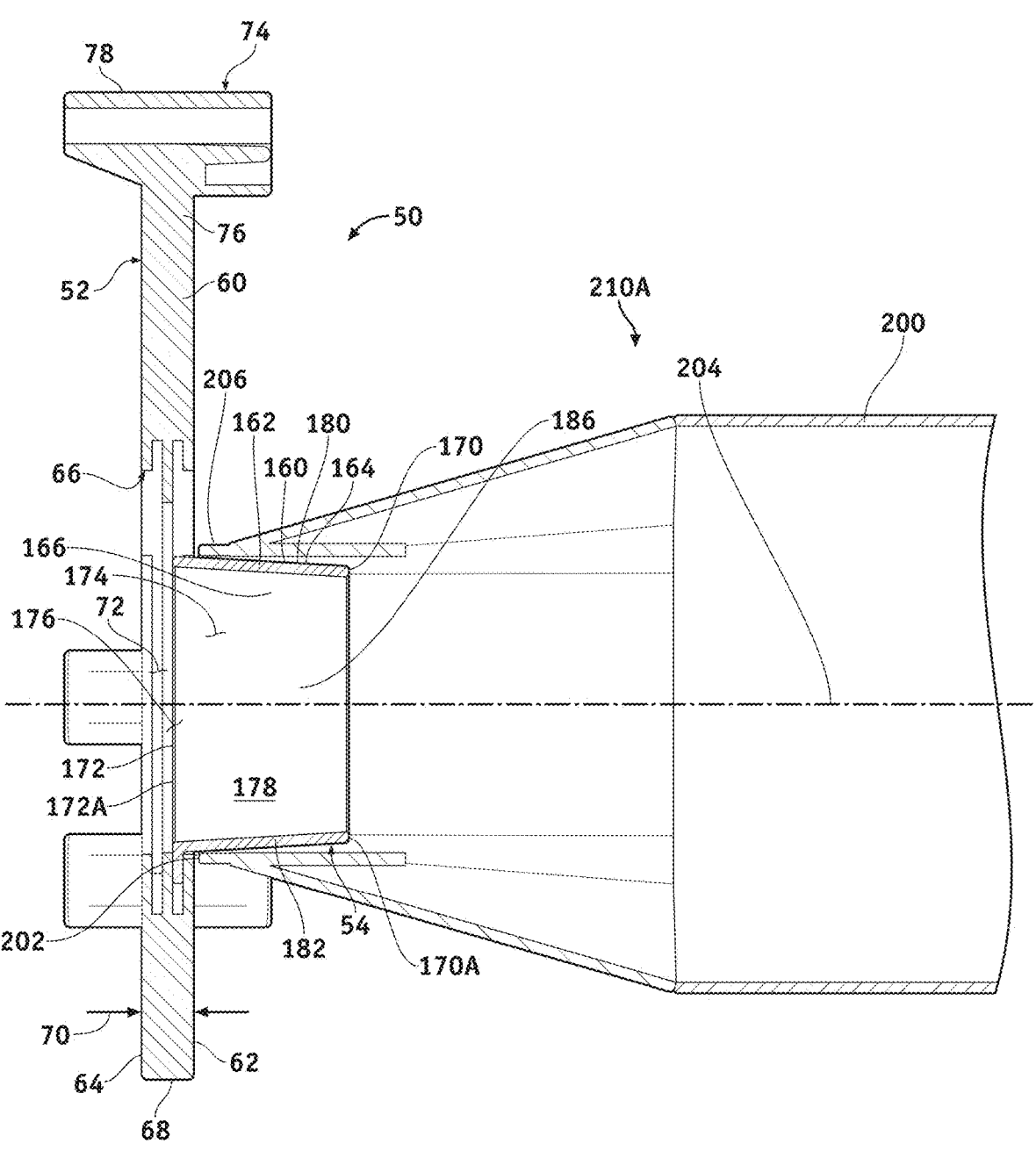
FIG. 16 is a view like FIG. 12, showing an alternate embodiment of an X-ray aiming ring setup.

In an alternate embodiment of a setup 210A in FIG. 16, the tube 200 is sized to fit over the outer surface 164 of the connector 54 when the connector 54 is inserted extremity 170 first into and through the tube's 200 open discharge end 202. As seen in FIG. 16, the connector 54 is inserted extremity 170 first into and through the tube's 200 open discharge end 202 that fits tightly over and directly against the connector's 54 outer surface 164 between the inlet 174 and the outlet 176, mechanically connecting the connector 54 to the tube 200. Accordingly, setup 210A in FIG. 16 demonstrates an alternate insertion joint between the connector 54 and the tube 200, in which the connector 54 is inserted extremity 170 first into the open discharge end 202 of the tube 200 that fits tightly over in direct contact against the connector's 54 outer surface 164 between the extremity 170 and the extremity 172. The mechanical connection of the aiming ring 52 to the open discharge end 202 of the tube 200 fitted over and connected to the outer surface 164 of the connector 54 in the setup 210A facilitates accurate and efficient axially alignment of the aiming ring 52 to the open discharge end 202 and the image receptor 220 supported on the outer side of the aiming ring's 52 surface 64 by the positioning arm 222 connected to the coupling 78 of one of the connectors 74 as discussed in FIG. 15, along the X-ray beam centerline 204 along which the X-ray beam generated by the X-ray machine travels outward through the X-ray beam channel 178 of the connector 54 from its inlet 174 and through the tube's 200 open discharge end 202 to the connector's 54 outlet 176 and outward through the aiming ring's 52 opening 72 from the connector's 54 outlet 176 to the image receptor 220 supported on the outer side of the aiming ring's 52 surface 64 as in FIG. 15. And so in setup 210A the connector's 54 extremity 170 and the tube's 200 open discharge end 202 are configured to be inserted one into the other, the connector's 54 extremity 170 into the tube's 200 open discharge end 202, to connect the coupling 54 mechanically to the tube 200 by the frictional engagement between the connector 54 and the tube 200. The connector 54 of the setup 210A connected mechanically between with the aiming ring 52 and the tube 200 is a mechanical interface between the aiming ring 52 and the tube 200, opening the connector's 54 X-ray beam channel 178 to the open discharge end 202 by the inlet 174 and axially aligning the open discharge end 202, the inlet 174, the X-ray beam channel 178, and the outlet 176 to the aiming ring's 52 outlet along the X-ray beam centerline 204 to effect accurate and efficient X-ray imaging. The open discharge end 202, the inlet 174, the outlet 176 and the opening 72 are parallel to each other in the setup 210A. The worker can separate the apparatus 50 from the tube 200 of the setup 210A simply by pulling them apart.

The size of the connector 54 enables it to connect releasably to the tube 202, whether over the tube 202, over the tube's 200 open discharge end 202, to connect the aiming ring 52 to the tube 200 to form the setup 210 in FIG. 15, or in the tube 200, in the tube's 200 open discharge end 202, to connect the aiming ring 52 to the tube 200 to form the setup 210A in FIG. 16. In either embodiment, connecting the connector 54 to the tube 200 is simple, quick, requires no specialized knowledge, skill, or tools, and requires no modification to the tube 202. The tapered configuration of the connector 54, how it tapers from extremity 172 to extremity 170, allows it to fit extremity 170 first in and connect to the open discharge end of tubes of slightly different sizes, allowing smaller tubes to fit over and directly engage the connector's 54 outer surface 164 proximate to the connector's 54 extremity 170, larger tubes to fit over and directly engage the connector's 54 outer surface 164 proximate to the connector's 54 extremity 172, as shown in the FIG. 16 setup 210A, and medium-sized tubes to fit over and directly engage the connector's 54 outer surface 164 at and proximate to the middle of the connector 54 between the extremity 170 and the extremity 172.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the invention, they are intended to be included within the scope thereof.

Having fully described the invention in such clear and concise terms as to enable those skilled in the art to understand and practice the same, the invention claimed is:

The invention claimed is:

1. An X-ray aiming ring apparatus, comprising:
an aiming ring including a body with a first surface and a second surface each extending radially outward from a peripheral extremity defining an opening through the aiming ring from the first surface to the second surface; and
a connector including a hollow body with a first extremity defining an inlet, a second extremity defining an outlet, and an X-ray beam channel through the hollow body from the inlet to the outlet, the hollow body extending outward to the first extremity from the second extremity inserted into the opening through the first surface and connected releasably to the aiming ring, the X-ray beam channel open to the opening by the outlet, and the first extremity configured to connect mechanically to an X-ray machine position-indicating tube having an open discharge end and arranged about an X-ray beam centerline, to open the X-ray beam channel to the open discharge end by the inlet and axially align the open discharge end, the inlet, the X-ray beam channel, and the outlet along the X-ray beam centerline.

2. The X-ray aiming ring apparatus according to claim 1, further comprising the aiming ring and the second extremity inserted into the opening through the first surface having interconnecting portions connecting the second extremity to the aiming ring releasably.

3. The X-ray aiming ring apparatus according to claim 2, wherein the interconnecting portions comprise male portions carried by the hollow body and female portions formed in the peripheral extremity between the first surface and the second surface, the male portions extend outward from the hollow body into the respective female portions, connecting the second extremity to the aiming ring releasably, wherein the female portions are open to the opening, enabling withdrawal of the male portions from the female portions to detach the second extremity from the aiming ring.

4. The X-ray aiming ring apparatus according to claim 3, wherein:
the second extremity comprises a rim defining the outlet; and
the male portions extend outward from the hollow body adjacent to rim.

5. The X-ray aiming ring apparatus according to claim 1, wherein the peripheral extremity includes an intermediate flange between the first surface and the second surface, the intermediate flange encircling the opening and confronting the second extremity, disabling the hollow body from moving into the opening beyond the intermediate flange.

6. The X-ray aiming ring apparatus according to claim 1, wherein the outlet is smaller than the opening of the aiming ring.

7. The X-ray aiming ring apparatus according to claim 1, wherein:
the outlet and the inlet are parallel to each other;
the outlet is larger than the inlet that is larger than the open discharge end; and
the channel tapers from the outlet to the inlet.

8. The X-ray aiming ring apparatus according to claim 7, wherein the open discharge end, the inlet, and the outlet are each rectangular.

9. The X-ray aiming ring apparatus according to claim 1, wherein the first extremity and the open discharge end are configured to be inserted one into the other to connect the coupling mechanically to the X-ray machine position-indicating tube.

10. An X-ray aiming ring setup, comprising:
an aiming ring including a body with a first surface and a second surface each extending radially outward from a peripheral extremity defining an opening through the aiming ring from the first surface to the second surface; and
a connector including a hollow body with a first extremity defining an inlet, a second extremity defining an outlet, and an X-ray beam channel through the hollow body from the inlet to the outlet, the hollow body extending outward to the first extremity from the second extremity inserted into the opening through the first surface and connected releasably to the aiming ring, the X-ray beam channel open to the opening by the outlet, and the first extremity connected mechanically to an X-ray machine position-indicating tube having an open discharge end and arranged about an X-ray beam centerline, opening the X-ray beam channel to the open discharge end by the inlet and axially aligning the open discharge end, the inlet, the X-ray beam channel, and the outlet along the X-ray beam centerline.

11. The X-ray aiming ring setup according to claim 10, further comprising the aiming ring and the second extremity inserted into the opening through the first surface having interconnecting portions connecting the second extremity to the aiming ring releasably.

12. The X-ray aiming ring setup according to claim 11, wherein the interconnecting portions comprise male portions carried by the hollow body and female portions formed in the peripheral extremity between the first surface and the second surface, the male portions extend outward from the connector into the respective female portions, connecting the second extremity to the aiming ring releasably, wherein the female portions are open to the opening, enabling withdrawal of the male portions from the female portions to detach the second extremity from the aiming ring.

13. The X-ray aiming ring setup according to claim 12, wherein:
the second extremity comprises a rim defining the outlet; and
the male portions extend outward from the hollow body adjacent to the rim.

14. The X-ray aiming ring setup according to claim 10, wherein the peripheral extremity includes an intermediate flange between the first surface and the second surface, the intermediate flange encircling the opening and confronting the second extremity, disabling the hollow body from moving into the opening beyond the intermediate flange.

15. The X-ray aiming ring setup according to claim 10, wherein the outlet is smaller than the opening of the aiming ring.

16. The X-ray aiming ring setup according to claim 10, wherein:
the outlet and the inlet are parallel to each other;
the outlet is larger than the inlet that is larger than the open discharge end; and
the channel tapers from the outlet to the inlet.

17. The X-ray aiming ring setup according to claim 16, wherein the open discharge end, the inlet, and the outlet are each rectangular.

18. The X-ray aiming ring setup according to claim 10, further comprising:

the first extremity comprising a rim defining the inlet; and the rim fit over an outward-facing annular recess formed in the X-ray machine position-indicating tube, mechanically connecting the first extremity to the X-ray machine position-indicating tube and locating the open discharge end within the inlet.

\* \* \* \* \*